J. B. BARTHOLOMEW.
PLOW.
APPLICATION FILED MAY 4, 1917. RENEWED JUNE 24, 1920.
1,359,860.
Patented Nov. 23, 1920.
7 SHEETS—SHEET 1.
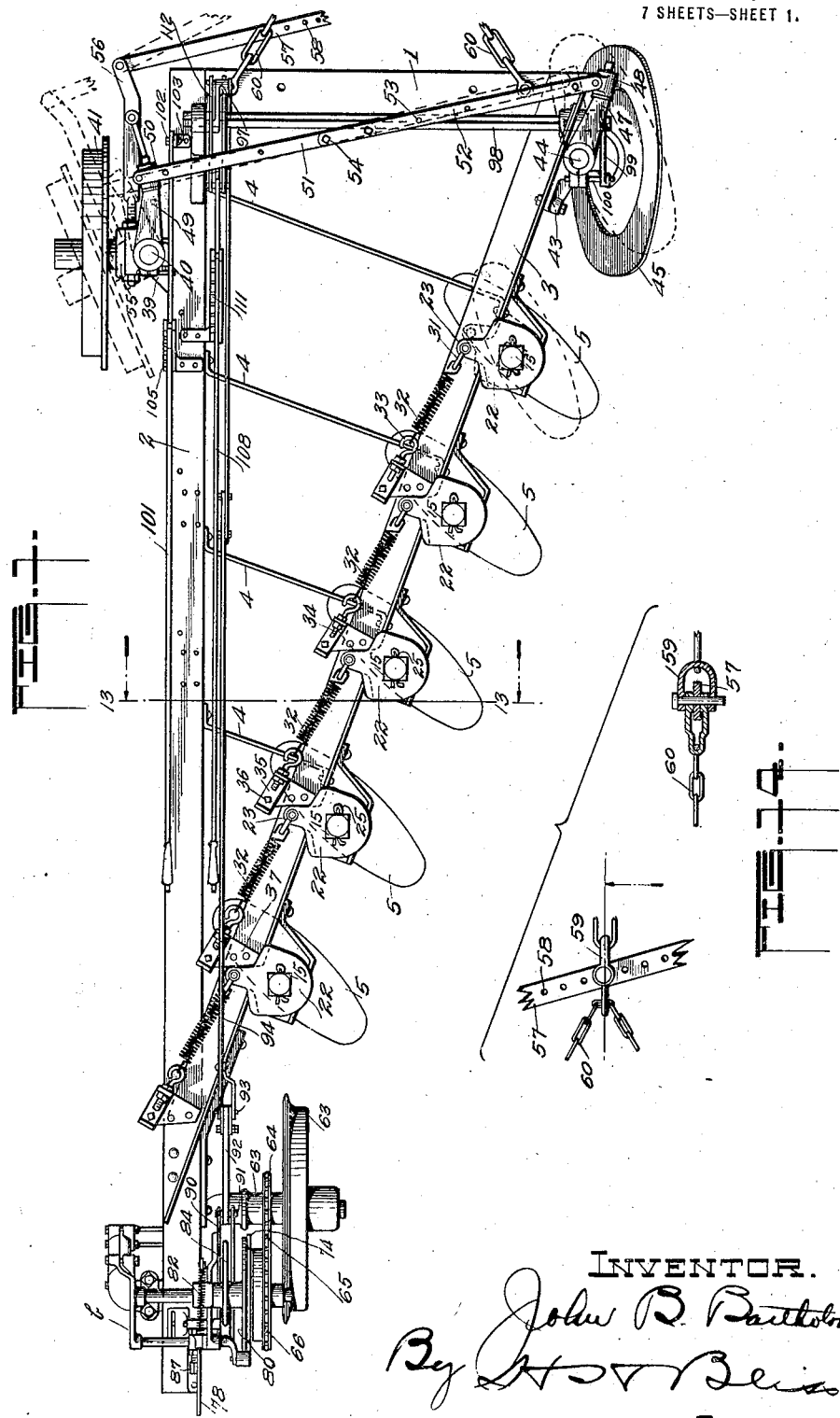
INVENTOR.
John B. Bartholomew
By H. V. Beis
ATTY J. B. BARTHOLOMEW.
PLOW.
APPLICATION FILED MAY 4, 1917. RENEWED JUNE 24, 1920.
1,359,860.
Patented Nov. 23, 1920.
7 SHEETS—SHEET 2.
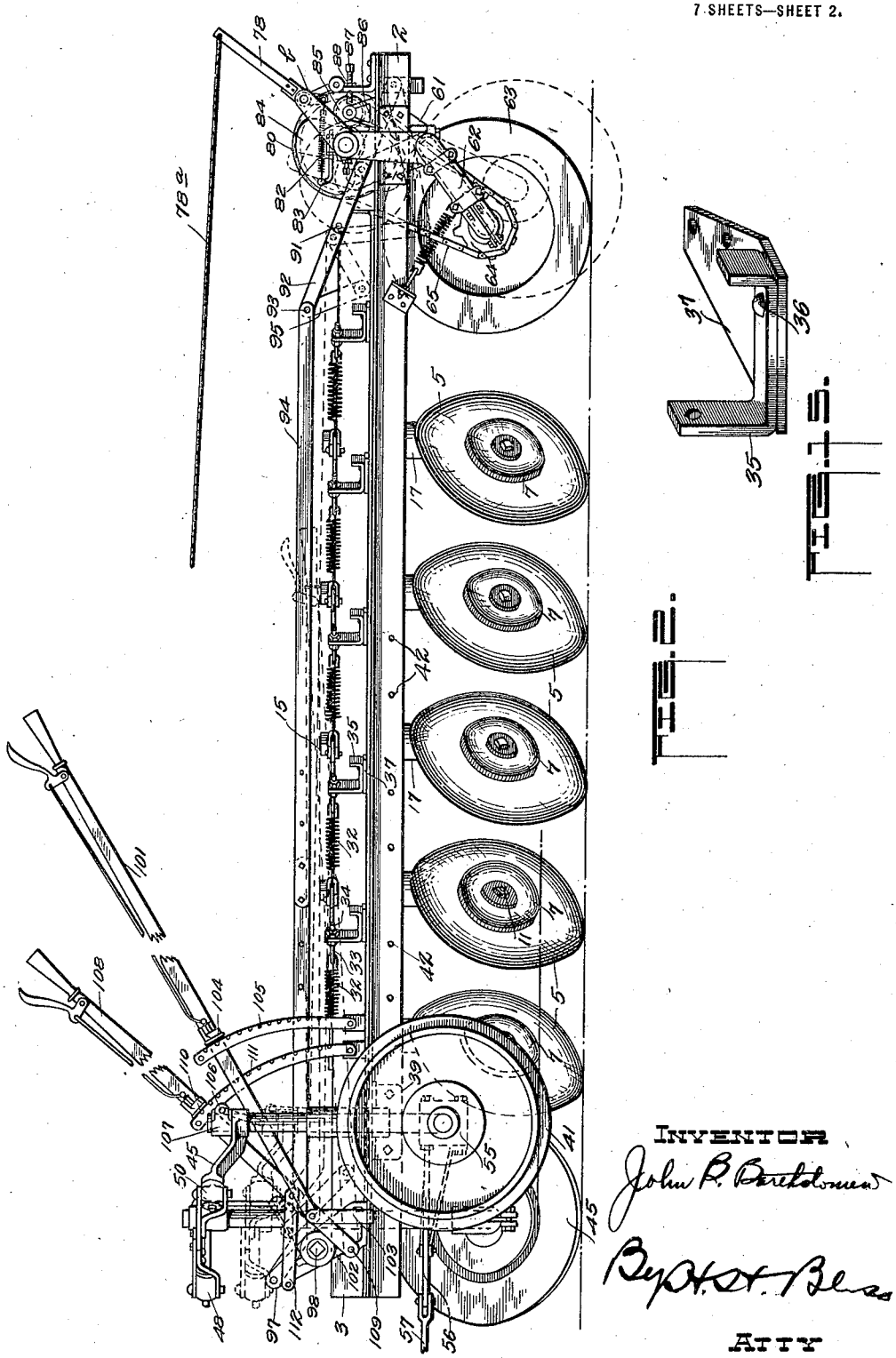

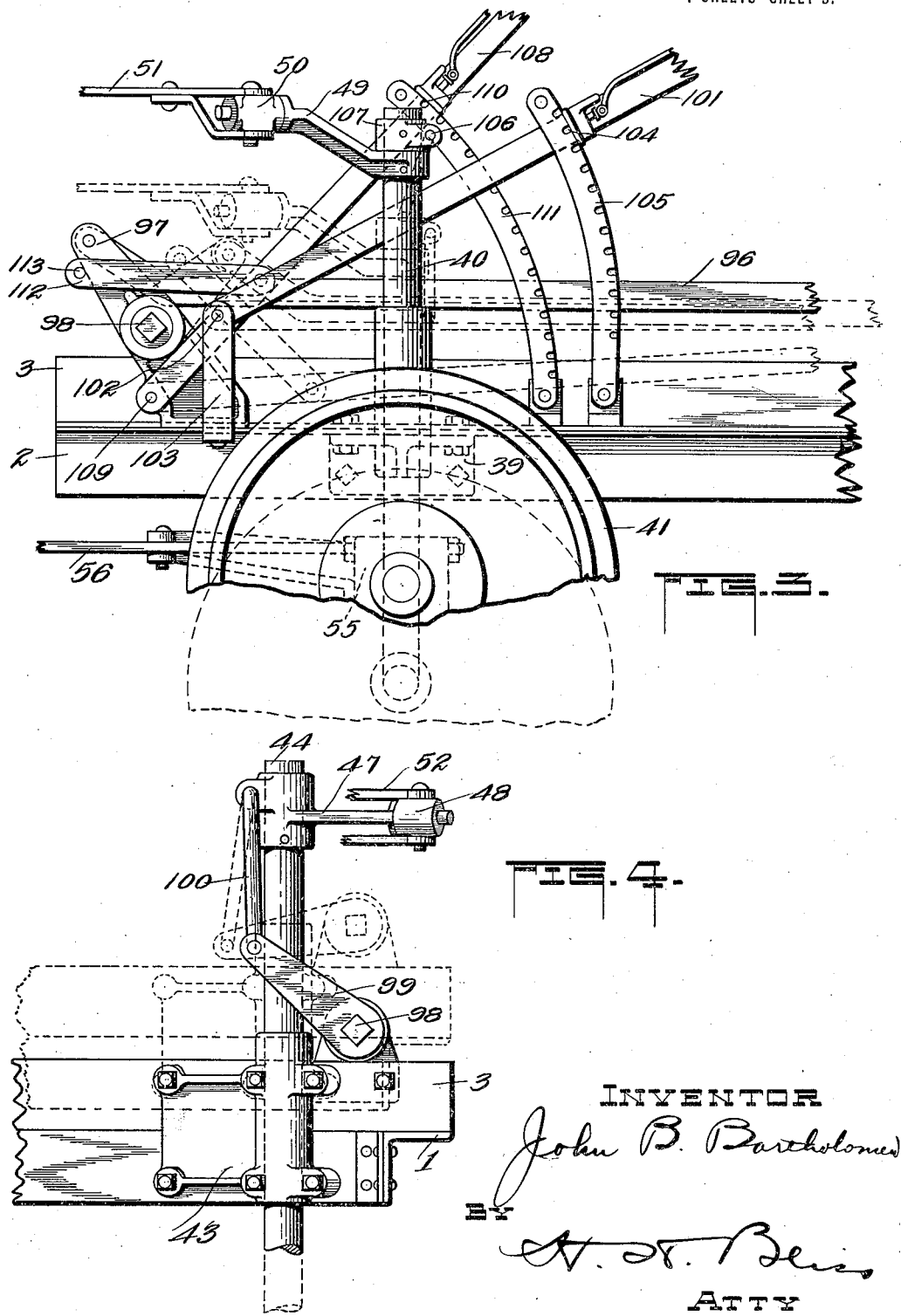

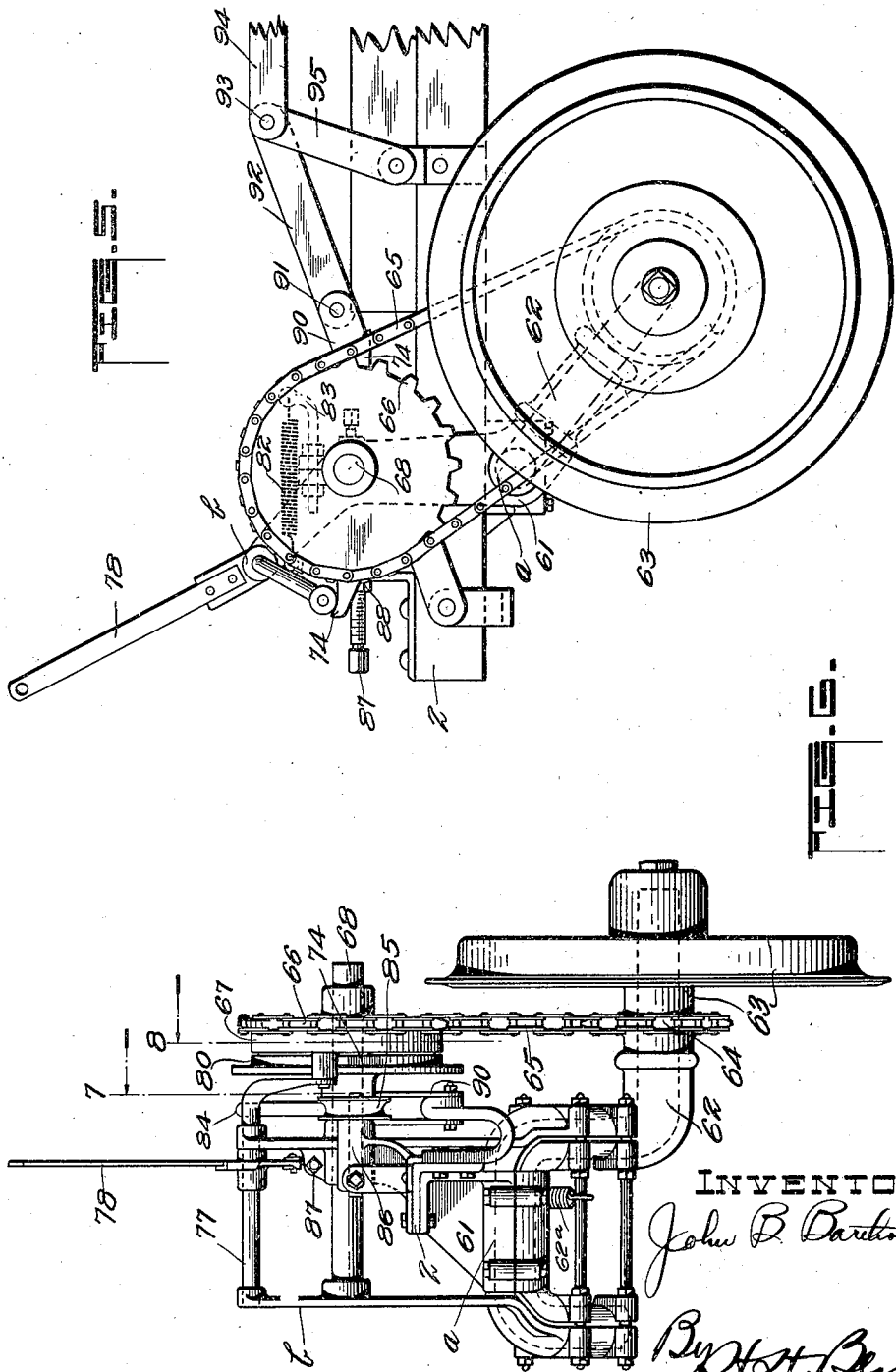

J. B. BARTHOLOMEW.
PLOW.
APPLICATION FILED MAY 4, 1917. RENEWED JUNE 24, 1920.
1,359,860.
Patented Nov. 23, 1920.
7 SHEETS—SHEET 5.
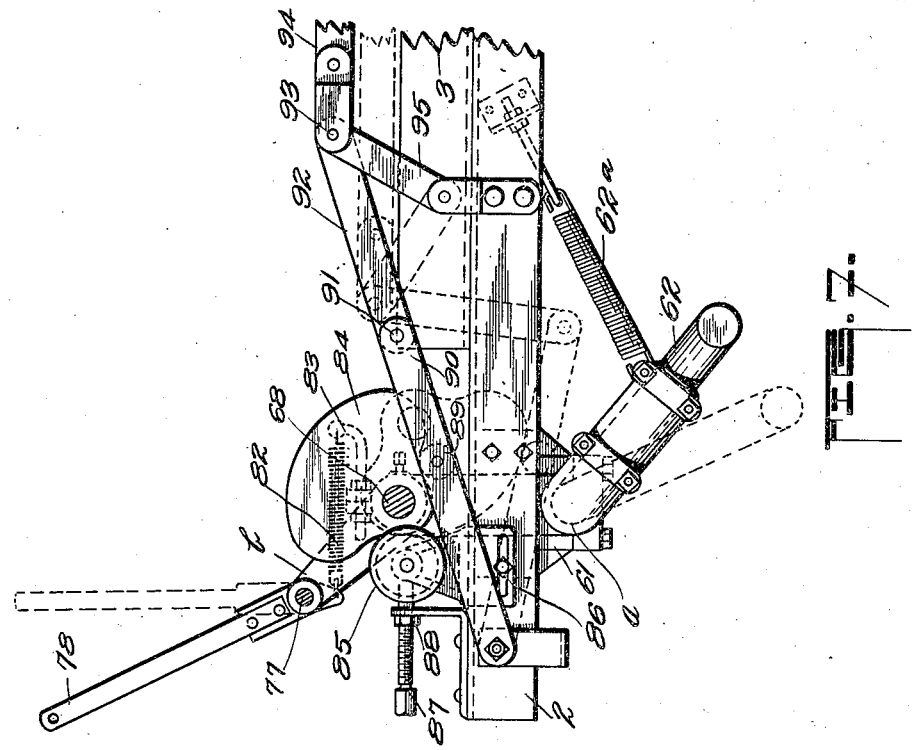
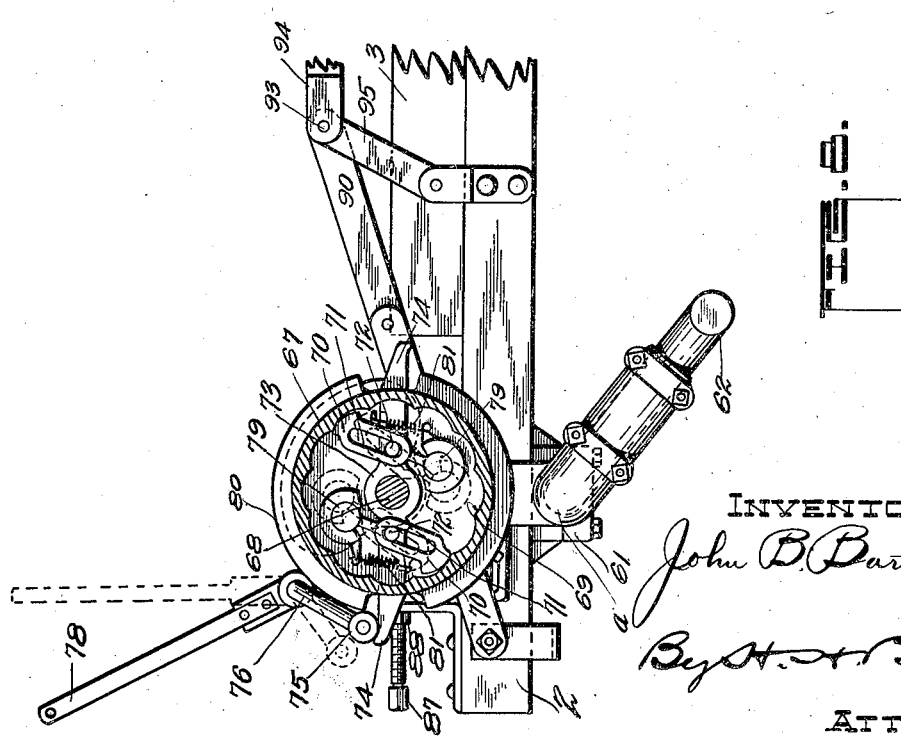
INVENTOR
John B. Bartholomew
By H. H. Bliss
ATTY

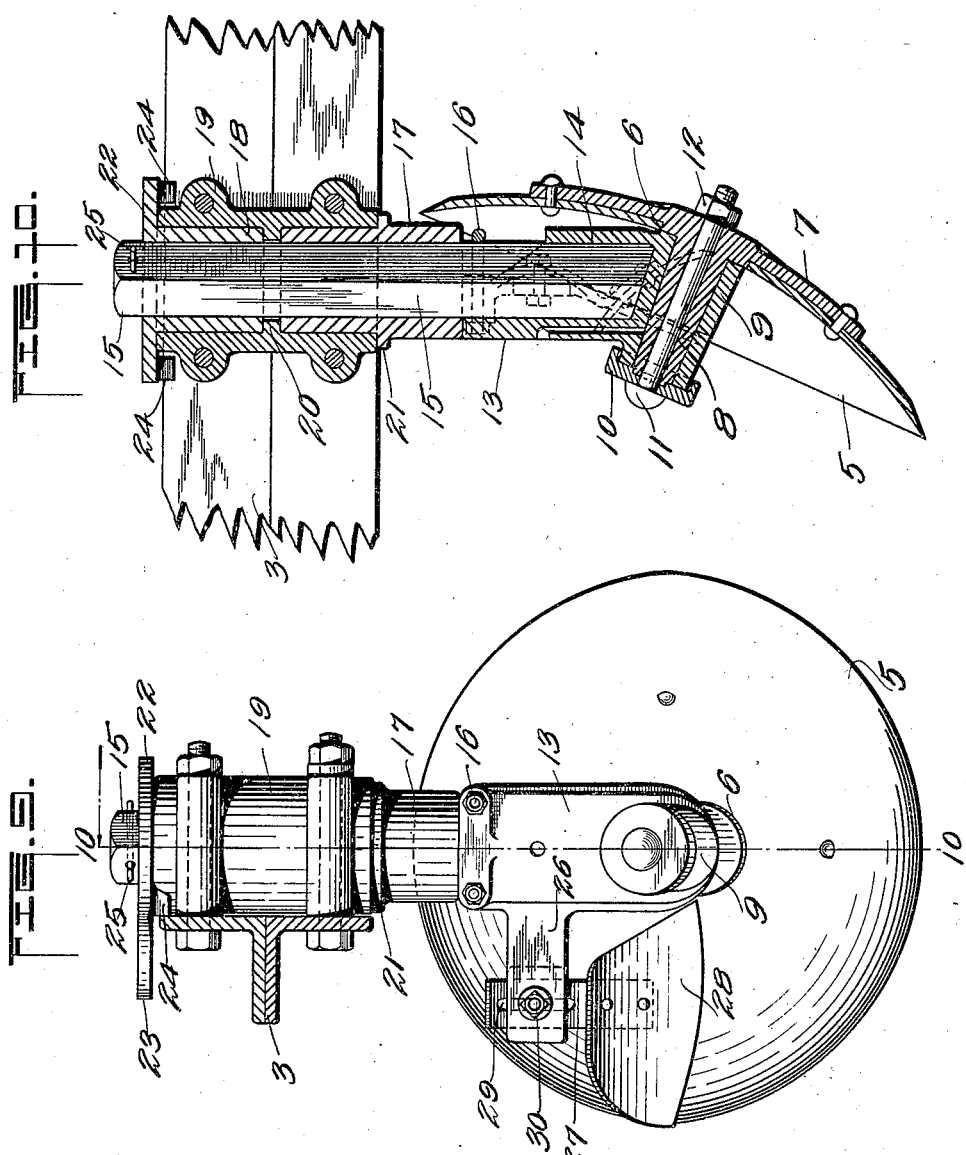

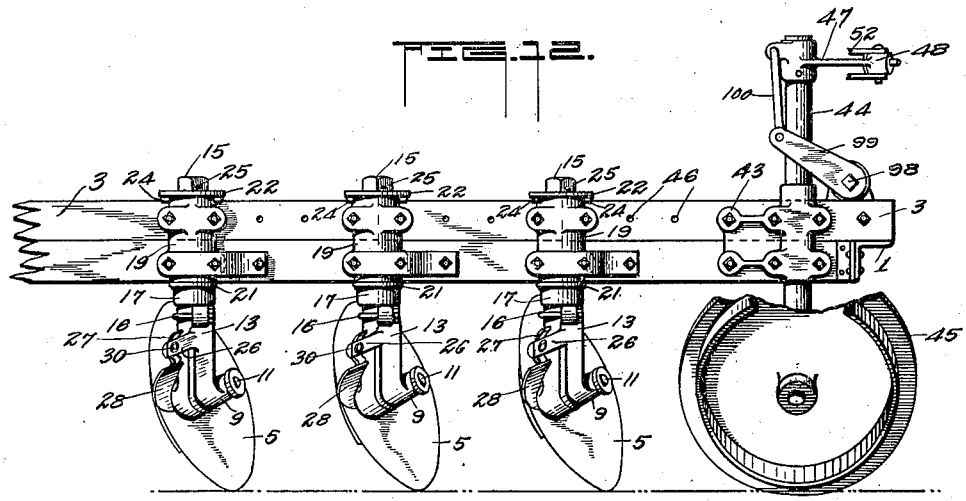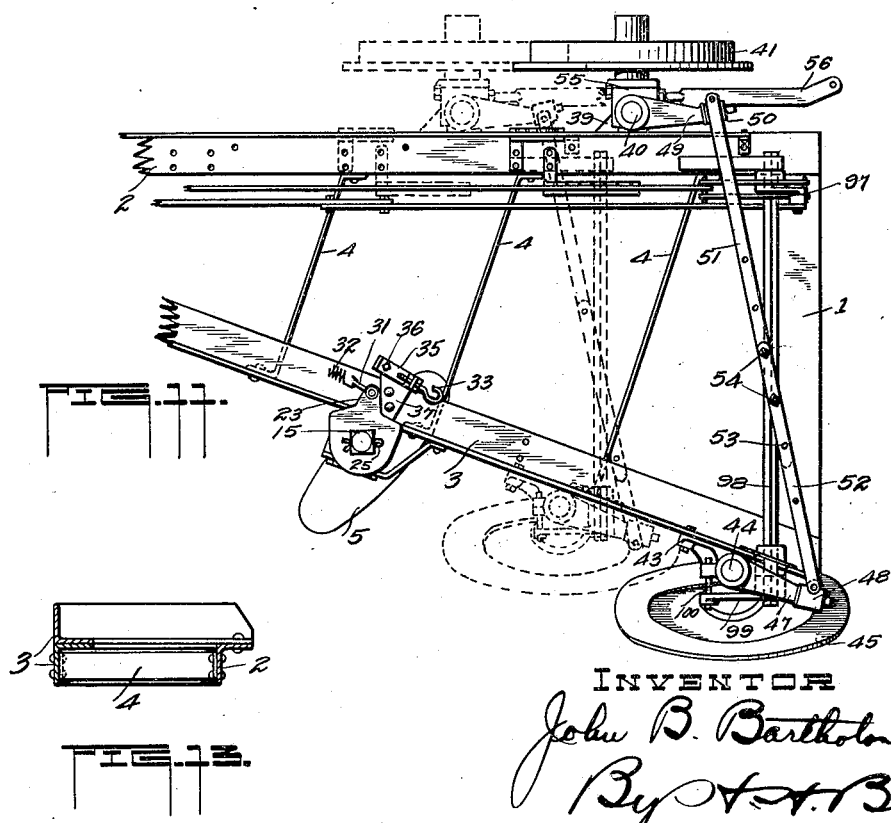

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

PLOW.

1,359,860. Specification of Letters Patent. Patented Nov. 23, 1920.

Application filed May 4, 1917, Serial No. 166,369. Renewed June 24, 1920. Serial No. 391,521.

*To all whom it may concern:*

Be it known that I, JOHN B. BARTHOLOMEW, a citizen of the United States, a resident of Peoria, in the county of Peoria and State of Illinois, have invented new and useful Improvements in Plows, of which the following is a specification.

This invention has reference to plows, and relates particularly to that type employing disks as the furrow forming elements.

One of the objects of the present invention is to provide a mechanism for raising the frame of the plow so as to elevate the furrow forming elements to inoperative position, and includes mechanism at the forward end of the plow which may be manually actuated, if desired, for raising the forward end of the frame and to clutch controlled mechanism at the rear end of the frame adapted to be actuated by the rear furrow wheel for automatically actuating the mechanism at both the forward and rear ends of the plow frame to lift the entire length of the frame, first raising the forward portion thereof and by the time the plow has traversed its length, to raise the rear portion thereof.

In the accompanying drawings, I have shown the embodiment of my invention which I now deem preferable. It is to be understood, however, that numerous changes and modifications may be made.

Figure 1 is a plan view of the entire plow, the front steering land wheels shown in adjusted positions, in dotted lines, and one of the disks also shown in an adjusted position, in dotted lines;

Fig. 2 is a side elevation of the plow looking at the rear faces of the disks, the disks appearing, as if in the ground;

Fig. 3 is a detail side elevation of a part of the forward portion of the plow frame, a part of a land wheel and mechanism having to do with the raising and lowering of the plow frame, the parts being shown in dotted as well as full lines;

Fig. 4 is a detail side elevation of a part of the forward portion of the plow frame, looking at that side of the machine, opposite to that shown in Fig. 3, and showing certain of the mechanism having to do with the raising and lowering of the plow frame;

Fig. 5 is a detail side elevation of a part of the rear portion of the plow frame, the rear land wheel and mechanism for raising and lowering the plow frame;

Fig. 6 is an end elevation of Fig. 5;

Fig. 7 is a vertical section, as the same would appear if taken on the line 7—7 of Fig. 6;

Fig. 8 is a vertical section, as the same would appear if taken on the line 8—8 of Fig. 6;

Fig. 9 is a detail elevation, partly in section, showing a front face view of one of the disks and bearing support therefor;

Fig. 10 is a vertical sectional view, as the same would appear if taken on the lines 10—10 of Fig. 9;

Fig. 11 is a plan view of the forward end of the plow showing in full lines the arrangement of disks and steering wheels as they are used in Fig. 1, and in dotted lines showing a feature of adjustment, wherein, the forward plowing disk may be removed to lessen the number of disks used, and moving the forward steering wheels backward, with one of said wheels occupying the space formerly occupied by the disk;

Fig. 12 is a side elevation of the forward portion of the plow, looking at the front faces of the disks;

Fig. 13 is a cross-section of the plow frame, as the same would appear if taken on the line 13—13 of Fig. 1;

Fig. 14 is a detail in plan and cross section showing the clevis connections between the plow and a tractor or other propelling means, and Fig. 15 is a perspective view of one of the attachments associated with one of the disk connections.

Like characters of reference denote corresponding parts throughout the figures.

*The frame.*—The frame for supporting the working parts of the machines includes, the front cross bar 1, the side bar 2, connected at one end to one end of said cross bar 1, and extending at right angles therefrom, and the angularly disposed bar 3 connected at one end to an end of the cross bar 1 and extending diagonally therefrom, is connected at its opposite end to the rear end portion of the side bar 2. While these bars 1, 2 and 3 may be of any well known construction and of lengths varying from those illustrated, whereby a larger or smaller machine may be made, in the matter of construction, I prefer that these bars be "angle" bars because they will permit of a much lighter frame construction and yet stand the strain to which the machine will be subjected.

The front and side angle bars 1 and 2 may comprise single bars, see Figs. 11, 12 and 13, but the bar 3, I prefer that it comprise a pair of angle bars laid one upon the other, as shown in Fig. 13. It is to these last mentioned bars the bearings for the disks and one of the land wheels are connected, and such a construction will prevent twisting of the bar 3. To further strengthen the frame I provide the plurality of cross braces 4 connecting the bars 2 and 3, as shown.

*Plowing elements.*—These elements include a plurality of concavo-convex disks 5, preferably five, in this instance, although the number of disks is not material, as machines may be made with two or more disks, as desired. As the disks are all of a similar construction and are all mounted on the frame in the same manner, the description of one disk and its mounting will suffice for all, reference being had particularly to Figs. 1, 9 and 10. The disk 5 has a central opening 6. The hub for the disk includes a plate 7 riveted or otherwise suitably secured against the convex surface of the disk and formed with the elongated tapered tubular bearing member 8 projecting through the opening 6. The bearing for the hub 8 of the disk is designated 9, and when the hub of the disk is journaled in said bearing, a cap 10 is employed to cover the end of said hub and the end of the bearing and the parts held in assembled relation by means of the bolt 11 and nut 12. The bearing 9 has the vertically disposed shank portion 13 formed with a square socket 14 and the front wall of said shank portion is longer than the rear wall, see Fig. 10. Seated in the square socket 14 of said bearing is the lower end of a square shaft 15 and said shaft 15 is secured to the shank of said bearing by means of the U bolt 16, holding it secure in the manner seen in Figs. 9 and 10. The upper part of said square shaft 15 has a bearing in the superimposed bushings 17 and 18 journaled in the bearing block 19 bolted or otherwise suitably secured to the two part bar 3 of the machine frame. This bearing block 19 is formed with a tubular opening therethrough, divided by an internal annular ring 20. The lower bushing 17 is inserted up into this bearing block 19, the ring 20 in the block and an annular flange 21 on the bushing which will engage with the lower end of the block limiting the upward endwise movement of the bushing 17 in said block 19. The upper bushing 18 is inserted into the upper end of the block 19, and on its upper end, (through which the shaft 15 protrudes,) the bushing 18 is formed with a flange 22 having a neck 23, and on the under side of the said flange on the opposite side of said neck 23 are lugs or stops 24 formed or otherwise suitably secured to said flange, for purposes to be explained.

The shaft 15 and the bushings 17 and 18 are secured in the assembled relation shown in Fig. 10, by the cotter-pin 25 passing through the upper end of said shaft 15 above the upper end of the bushing 18. Extending laterally from one side of the shank portion 13 of the bearing 9 is an arm 26, and connected to said arm so as to be vertically adjustable thereon is the shank 27 of a scraping blade 28. Such adjustable connection is obtained by slotting the shank 27 vertically, as at 29, and passing a securing bolt 30 through the slot of said shank and an opening in the arm 26, see Fig. 9, the scraping blade 28 acting against the concave surface of the disk 5.

A five disk plow would have the disks 5 coupled to the frame in the manner seen in Fig. 1, and the arrangement for the coupling of the disks to said frame is such, as will be more fully explained, that one or more disks may be removed, to reduce the plow to a four disk plow, or less as may be desired. An important improvement in the coupling of the disks to the frame resides in the location of the bearings for the disks. It is to be observed that the bearings 9 are forward of the disks so that there is a pulling or drawing action upon the disks as the plow moves forward, instead of a pushing action common in similar plows. Further, the disks are so coupled to the frame that said disks and their shaft supports may oscillate, should the disks encounter any obstructions, such as rocks or stumps of trees, and which would have a tendency to swing the plow frame out of line or twist the frame supports, the disks being immediately returned to their operative positions upon passing any such obstructions. The scraping blade 28 being also supported or carried by the bearing 9, the scraper will also swing with the disk and its support. To accomplish these purposes, a link 31 is connected to the neck 23 of the flange 22 of said upper bushing 18, and connected with the link 31 is a spring 32 which has its opposite end connected to the hook 33 of a bolt 34, said bolt having an adjustable connection with an arm 35 pivoted at 36 to a bracket plate 37 riveted or otherwise suitably secured to the bar 3 of the frame, see Fig. 1. In their normal position, the forward lug or stop 24 on the bushing 18 is in engagement with the bar 3 of the frame, retaining the disks in their working positions, as shown in full lines in Fig. 1. When the disk strikes an immovable object and the disk is swung to the dotted position, shown in Fig. 1, the rear lug or stop 24 on the bushing 18 is moved into engagement with the bar 3 of the frame, limiting the swinging movement of the disk. The oscillation of the bushing 18 will expand the spring 32 and upon the disk passing the obstruction the spring 34 will contract, returning the disk to operative position.

*Forward wheels and steering devices.*— Bolted or otherwise suitably attached to the forward end of the bar 2 of the frame is a boxing 39 and having a bearing in said boxing is an upright shaft member 40 having a lower right angle portion on which is journaled a land wheel 41. The boxing 39 is detachable and removable, for purposes to be explained, and therefore other bolt openings 42 are provided in the bar 2 for this purpose. Also bolted or otherwise suitably attached to the forward end of the two-part bar 3 of the frame is a boxing 43 and having a bearing in said boxing is an upright shaft member 44 having a lower angular portion on which is journaled a land wheel 45. The boxing 43, like the boxing 39 is detachable and removable for purposes to be explained, and therefore other bolt openings 46 are provided in the two-part bar 3, used in connection with the bolt openings for the bolts holding the bearing blocks 19, for this purpose. To the upper end of the shaft member 44 is connected a crank-arm 47 on the end of which is a coupling 48, and on the upper end of the shaft member 40 is connected a crank-arm 49, on the end of which is a coupling member 50. Connected to the coupling member 50 is one end of a reach bar 51, and said bar has an adjustable connection with a similar reach bar 52, which, at its outer end, is connected to the coupling member 48. Both said reach bars have a plurality of bolt holes 53 to receive bolts 54 and permit the adjustable connection between said bars, whereby the distance between the coupling members 48 and 50 may be shortened if desired.

Connected to the lower portion of the shaft member 40 is a bearing block 55, and to said block is connected a bar 56 with which is pivotally connected a coupling bar 57 provided with a plurality of bolt holes 58. Having an adjustable connection with said bar 57 through either of the bolt holes 58 is a clevis 59, see Fig. 11 by means of which the plow is coupled to a suitable tractor or other propelling means, and connected to said clevis and said bar 57, are draft chains 60, the purposes of which are clearly apparent. It is obvious that shifting the bar 57 endwise in opposite directions, through the connections described with the shaft members 40 and 44, that the land wheels 41 and 45 may be turned to steer the plow.

*Rear furrow wheel and frame lifting mechanism.*—To the rear end of the bar 2 of the frame is secured a composite bearing 61, in the part *a* of which is journaled the bent axle 62, on the end of which is journaled the furrow wheel 63 adapted to travel in the furrow cut by the last disk of the series of disks. When the disks 5 are in the soil, the wheel 63 is forward of the position it will be caused to assume when the disks have been raised out of the soil as best seen in full and dotted lines in Fig. 2. To the hub of the wheel 63 is connected a sprocket pinion 64 and engaging the teeth of said pinion 64 is a sprocket chain 65 which also engages the sprocket teeth of a sprocket wheel 66 connected with or forming a part of a drum 67 loosely carried on a short shaft 68 journaled in the part *b* of the bearing 61. This drum constitutes one member of a clutch and is formed internally and circumferentially with a plurality of connected corrugations or concave depressions or seats 69 with which frictionally engage the clutch shoes 70. Each shoe has a longitudinal slot 71 in which works a pin 72 extending laterally from a locking bar 73. Said bar is carried on the shaft 68 and is formed with extension locking ends 74 projecting beyond the peripheral surface of the drum 67, see Fig. 8, and are adapted to alternately have a locking engagement with a roller 75 carried by a swingable arm 76 connected with a rocking rod 77 journaled in the part 2 of the bearing 61, and connected with said rod 77 to rock it, is a lever 78. The shoes 70 are fulcrumed at 79 in suitable bearings preferably cast within an annular flanged disk-like member 80 secured to the shaft 68. To the shoes 70 and the disk-like member 80 are connected opposite ends of springs 81 which coöperate with the bar 73 in controlling the said shoes 70. To return the lever 78 and the roller 77, to their normal positions, I employ the spring 82 connected with the lower end of said lever and to arm 83 connected with the bearing 61.

On the shaft 68, spaced a short distance from the rear face of said member 80 is carried a cam 84 having the irregular periphery shown in Fig. 1 and said cam is adapted to ride against the roller 85 and between the flanges thereof. This roller is journaled on a bracket 86 adjustably mounted on the bar 2 of the frame and associated therewith is an adjusting screw 87 and a locking nut 88, for purposes apparent. Said cam 84 is also adapted to ride against a roller 89 journaled on a bar section 90, which said bar section is pivoted at its rear end to the bar 2 of the frame and at its forward end has a pivotal connection at 91 with a bar section 92, and said bar section 92 has a pivotal connection at 93 with the rear end of a longitudinally disposed bar section 94, and to the pivot 93 is also connected a link 95 which also has a pivotal connection with the bar 2 of the frame. The bar section 94 is connected at its forward end to a similarly longitudinally disposed bar section 96, which, at its forward end is pivotally connected to a crank arm 97 on one end of a transversely disposed square shaft 98, the latter being journaled in suitable bearings on the frame parts 2 and 3. To the opposite end of said shaft 98 is connected a crank arm 99, similar to the arm 97, and to said crank arm 99 is connected a link 100 which is coupled preferably, to the hub portion of the crank arm 47 secured to the upper end of the shaft member 44, see Figs. 1 and 4.

The mechanism last described, including the cam 84, clutch parts and operative connections between these parts and the shaft member 44 have to do with the automatic raising of the front and rear working parts of the plow, by means of said clutch and cam mechanism. There is provided, in addition to the foregoing mechanism, a lever mechanism which I will now describe for manually lifting the front end of the plow. This mechanism is best seen in Figs. 1, 2 and 3, and includes, first, the lever 101, fulcrumed at 102 to a bracket 103 mounted on the bar 2 of the frame. This lever has the usual pawl or detent mechanism 104 adapted to have a locking engagement with the toothed segment 105, and connected to said lever 101 is a link 106 which is also connected to a collar 107 secured to the upper end of the shaft member 40. There is also a lever 108 fulcrumed preferably at 109 to one of the bearings for the transverse shaft 98. This lever has the usual pawl or detent mechanism 110 adapted to have a locking engagement with the toothed segment 111 and pivotally connected to said lever 108 are a pair of links 112 which straddle the forward end of the bar section 96 and the crank 97 to which it is pivotally connected and the outer ends of said links are connected by a pin 113 normally bearing against the crank arm 97.

Assuming now that the plow is in the field with the disks 5 operating in the ground and the operator desires to lift the frame of the plow so as to raise the disks to inoperative position, he will depress the lever 101 and through the link connection 106 between the said lever and the collar 107 on the shaft member 40, this side of the frame may be raised, being the left hand side of the machine looking forward thereof. The operator, will at the same time pull the rope 78ª which will swing the lever 78 from the full line position shown in Figs. 7 and 8, to the dotted line position shown in said figures, which will both expand spring 82 and release the roller 75 from locking engagement with the locking end 74 of the bar 73 included in the clutch mechanism. The plow moving forward, the motion which is then imparted from the furrow wheel 63 to the chain 65, will immediately impart rotation to the shaft 68 by reason of the clutch engagement of the shoes 70 with the drum 67. The rotation of the shaft 68 will continue for half a revolution and at which time the opposite locking end 74 of the bar 73 will have moved to a position to engage the roller 75 which has been returned to its locking position, through the contraction of the spring 82, as will be understood, and the additional slight motion which is given to the disk-like member 80 will move the shoes 70 to the position shown in dotted lines in Fig. 8. As the shaft 68 begins to rotate, the cam 84 is also rotated, and it riding against the roller 89 of the bar section 90, will move the bar 90 into dotted line position, shown in Fig. 7, collapsing or folding the bar sections 90 and 92, and the link 95 in the dotted line position shown in Fig. 7, and drawing the bar sections 94 and 96 in an end-wise direction toward the rear of the plow. Such motion will swing the crank arm 97, see Fig. 3, into dotted line position shown in said figure, the movement of such crank arm being a free movement between the links 112. The swinging of the crank arm 97 will rock the transversely disposed shaft 98 and such rocking motion will be transmitted across the machine to the crank arm 99, which will be swung into the dotted line position shown in Fig. 4, and result in the raising of the right hand side of the forward portion of the plow.

Through the mechanism just described, the lever 101 and rope 78ª for actuating the lever 78, it is obvious that both sides of the forward end of the plow frame may be raised practically or nearly simultaneously; the one side by a manually operated means and the other side by a mechanism which is automatically actuated from the land wheel 63, after the clutch parts have been set in motion.

Should the operator not desire to rely upon the mechanism actuated by the clutch for raising the front portion of the frame, he could operate the lever 108 by depressing the same which would draw the links 112 in a forward end-wise direction and by means of the pin 113 actuating the crank arm 97 to rock the shaft 98, all of which it is believed is fully apparent.

By the time the plow has traversed its length, or in other words, by the time the furrow wheel 63 has reached the point in the movement of the plow at which the lever 101 and rope 78ª are actuated, the cam 84 which is also riding against the roller 85, see Fig. 7, would have moved to the position shown in dotted lines in Fig. 7, causing the axle 62 to be swung from the full line position to the dotted line position shown in Fig. 7, resulting in the raising of the rear end of the frame. By the time this has been accomplished, the half revolution of the shaft 68 is completed and the bar 73 coming into locking engagement with the roller 75, will result in the separation of the clutch parts, the stopping of the rotation of the shaft 68. The movement of the axle 62 is against the tension of the spring 62ª which will assist in returning the axle to the full line position shown in Fig. 7, when it is again desired to lower the frame.

A comparison of Figs. 11 and 12 with Fig. 1, will show the manner of removing the forward disk 5 so as to provide the plow with only four plowing disks and the provision for readjusting the wheels at the forward end of the plow, and operating connections, to adapt the plow to a four disk plow. This adjustment may be carried out as far as desirable. That is to say, the frame may be so constructed that the plow may be changed from a five to a four or to a three disk plow, although it is preferable to make the plows so that if it is a five disk plow, it may be changed to a four and if it is a four disk plow it may be changed to a three and if it is a three disk plow, it may be changed to a two, all of which it is believed will be fully understood.

What I claim is:—

1. In a plow, in combination, front and rear furrow wheels, a plurality of disks suitably journaled on said frame, mechanism for first raising the forward end of the plow frame and subsequently the rear end thereof during the travel of the plow and from said rear wheel including a mechanism disposed at the forward end of the frame for raising and lowering the same, a mechanism disposed at the rear end of the frame for raising and lowering the same, an operating shaft, clutch devices for operating said shaft, means for operating said clutch devices from the rear wheel, a controlling means for said clutch devices, and means for actuating the same, and means actuated from said operating shaft for operating said forward and rear raising and lowering mechanism.

2. In a plow, in combination, a frame, front and rear furrow wheels, a plurality of disks suitably journaled on said frame, mechanism at the forward end of the frame for raising the frame and disks, a lever mechanism for actuating said raising mechanism, mechanism at the rear end of the frame for raising the frame and disks, an operating shaft, a clutch mechanism for operating said shaft, means for operating said clutch mechanism from said rear wheel, means for controlling said clutch and operating means between the clutch mechanism and said forward and rear raising mechanism, said operating means adapted to be actuated by said clutch, for first raising the forward end of the frame, and then for raising the rear end of said frame.

3. The combination of the frame, the earth turning plow devices arranged in a diagonal series and held normally in rigid relation, vertically, with the frame, the front land wheel, the front furrow wheel, the rear furrow wheel all vertically adjustable relatively to the plow frame, means for causing the rear furrow wheel to elevate the rear end of the plow frame, and power transmitting devices actuated by the said elevating means and arranged to lift the front end of the frame prior to the lifting of the rear end.

4. The combination of the plow frame, the supporting wheels including a front furrow wheel and a rear furrow wheel vertically adjustably supporting the frame, continuously going power devices driven by the rear furrow wheel, the power transmitting devices for lifting the frame on the front wheel and the rear wheel successively, and optionally controlled means for connecting the said power devices and the said power transmitting devices.

5. The combination of a rear furrow wheel, a front furrow wheel, a front land wheel, the frame vertically adjustable on said wheels, one or more earth-turning plow devices carried by and normally fixed in position on the frame, power devices driven by the rear furrow wheel, power transmitting devices for lifting the rear end of the frame on said rear wheel, power transmitting devices for lifting the front end of the frame, and an optionally controlled clutch for causing the power devices to actuate the aforesaid power transmitting devices.

6. The combination of the plow frame, the two front frame-supporting wheels, the rear frame-supporting furrow wheel, the continuously going power devices driven by the rear furrow wheel, power transmitting devices for lifting the frame on the rear wheel and on one of the said front wheels, optionally controlled means for intermittingly connecting the power devices and the power transmitting devices, and manual devices for adjusting the frame on the other front wheel.

7. The combination of the plow frame, the front furrow wheel, the front land wheel, the rear furrow wheel, said furrow wheels adjustably supporting the frame, the power devices actuated by the rear furrow wheel, the power transmitting devices for lifting the frame on said rear wheel, the power transmitting devices for lifting the frame on the front furrow wheel, the optionally controlled means for connecting the power devices to the aforesaid power transmitting devices, and manual means for vertically adjusting the frame on the land wheel.

8. The combination of the plow frame, the front land wheel, the front furrow wheel, the rear furrow wheel, the transversely arranged rock shaft connected with the front furrow wheel for lifting it, the movable axle for the rear wheel, the power devices actuated by the rear furrow wheel, and the optionally controlled means for intermittingly connecting the power devices to the said axle and to the said rock shaft.

JOHN B. BARTHOLOMEW.